United States Patent
Karjee et al.

(10) Patent No.: US 10,560,530 B2
(45) Date of Patent: Feb. 11, 2020

(54) DATA ANALYSES USING COMPRESSIVE SENSING FOR INTERNET OF THINGS (IOT) NETWORKS

(71) Applicant: Tata Consultancy Services Limited, Mumbai (IN)

(72) Inventors: Jyotirmoy Karjee, Bengaluru (IN); Hemant Kumar Rath, Bhubaneswar (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 93 days.

(21) Appl. No.: 16/008,351

(22) Filed: Jun. 14, 2018

(65) Prior Publication Data

US 2019/0260830 A1  Aug. 22, 2019

(30) Foreign Application Priority Data

Feb. 16, 2018 (IN) .............................. 201821006047

(51) Int. Cl.
*H04L 29/08* (2006.01)
*H04L 12/66* (2006.01)
(Continued)

(52) U.S. Cl.
CPC .............. *H04L 67/12* (2013.01); *H04L 12/66* (2013.01); *H04L 41/147* (2013.01);
(Continued)

(58) Field of Classification Search
CPC ..... H04L 67/12; H04L 69/04; H04L 43/0823; H04L 43/16; H04L 43/045; H04L 43/028;
(Continued)

(56) References Cited

U.S. PATENT DOCUMENTS

| 9,413,858 | B2 | 8/2016 | Leung et al. |
| 2016/0212245 | A1 | 7/2016 | Shoaib et al. |

OTHER PUBLICATIONS

Coluccia, G. et al. (Sep. 2012). "Progressive Compressed Sensing and Reconstruction of Multidimensional Signals Using Hybrid Transform/Prediction Sparsity Model," *IEEE Journal on Emerging and Selected Topics in Circuits and Systems*, vol. 2, No. 3; pp. 340-352.

(Continued)

*Primary Examiner* — Jungwon Chang
(74) *Attorney, Agent, or Firm* — Finnegan, Henderson, Farabow, Garrett & Dunner LLP

(57) ABSTRACT

Internet of Things (IoT) devices (101A) continuously capture raw data over a regular interval of time. The captured raw data is transmitted to gateway devices (101B) deployed in an environment, for example, a warehouse. Continuous transmission of such data leads to data redundancy, continuous channel utilization and bandwidth usage, etc. To overcome this problem, present disclosure implements a Compressive Sensing based Data Prediction (CS-DP) model that predicts data at the gateway devices by learning the data pattern received from IoT devices, estimates and computes, using a Compressive Sensing based Data Estimation (CS-DE) model, optimal data instead of considering the overall data captured at the gateway devices and reconstructs, using a Compressive Sensing based Data Reconstruction (CS-DR) model, missing data and/or corrupted data using the partial information received at the gateway devices.

20 Claims, 9 Drawing Sheets

(51) Int. Cl.
*H04L 29/06* (2006.01)
*H04L 12/26* (2006.01)
*H04L 12/24* (2006.01)
*H04L 12/801* (2013.01)
*H04L 12/939* (2013.01)

(52) U.S. Cl.
CPC .......... *H04L 43/0823* (2013.01); *H04L 43/16* (2013.01); *H04L 69/04* (2013.01); *H04L 43/028* (2013.01); *H04L 43/045* (2013.01); *H04L 43/0829* (2013.01); *H04L 47/127* (2013.01); *H04L 49/552* (2013.01)

(58) Field of Classification Search
CPC . H04L 43/0829; H04L 47/127; H04L 49/552; H04L 12/66
See application file for complete search history.

(56) References Cited

OTHER PUBLICATIONS

Deak, G. et al. (2013). "IoTs (Internet of Things) and DfPL (Device-free Passive Localisation) in a disaster management scenario," *Simulation Modelling Practice and Theory*, vol. 35; pp. 86-96.

(a) Normal Data (b) Abnormal Data

DATA ANALYSES USING COMPRESSIVE SENSING FOR INTERNET OF THINGS (IOT) NETWORKS

PRIORITY CLAIM

This U.S. patent application claims priority under 35 U.S.C. § 119 to: India Application No. 201821006047, filed on Feb. 16, 2018. The entire contents of the aforementioned application are incorporated herein by reference.

TECHNICAL FIELD

The disclosure herein generally relates to data analytics, and, more particularly, to data analyses using compressive sensing for Internet of Things (IoT) networks.

BACKGROUND

In environments for example, warehouses, Internet of Things (IoT) devices such as sensors, actuators, robots, drones, etc., continuously capture raw data over a regular interval of time. The captured raw data is then wirelessly transmitted to gateway devices deployed in warehouse environments. Gateway devices are considered as storing gadgets which gather and aggregate sensor data by analyzing the data pattern and finally transmit it to the Cloud. In a warehouse deployment scenario, IoT devices continuously transmit similar type of data for a longer duration to the gateway devices which leads to data redundancy, continuous channel utilization and bandwidth usage, which may also lead to loss in data and/or inaccuracy in the received data.

SUMMARY

Embodiments of the present disclosure present technological improvements as solutions to one or more of the above-mentioned technical problems recognized by the inventors in conventional systems. For example, in one aspect, there is provided a processor implemented method. The method comprises receiving, by one or more gateway devices, using a Compressive Sensing based Data Prediction (CS-DP) model, observation data from one or more Internet of Things (IoT) devices at one or more time intervals, wherein the observation data is received when the one or more gateway devices are in an adaptation phase, and wherein the observation data comprises a plurality of data packets; capturing by the one or more gateway devices, a sequence of raw data samples from the received observation data in a data vector representation; computing at each of the one or more gateway devices, a first prediction error based on a residual weighted vector and a prediction vector, wherein the prediction vector is computed using the sequence of raw data samples captured in the data vector representation, and wherein the residual weighted vector is computed using the prediction vector; switching the one or more gateway devices to an estimating phase and computing at each of the one or more gateway devices, using a Compressive Sensing based Data Estimation (CS-DE) model, bind information for each of the one or more IoT devices, and transmitting thereof, wherein the bind information is computed when the first prediction error is less than a first pre-defined threshold; obtaining a second prediction error from each of the one or more IoT devices, wherein the second prediction error is computed based on the bind information received from the one or more gateway devices; and switching the one or more gateway devices to a prediction phase and identifying and re-constructing at least one of missing data and corrupted data in the plurality of data packets, using a Compressive Sensing based Data Reconstruction (CS-DR) model, wherein the at least one of missing data and corrupted data in the plurality of data packets are reconstructed when the second prediction error is less than a second pre-defined threshold.

In an embodiment, when the first prediction error is greater than the first pre-defined threshold, the method comprises switching the one or more gateway devices to an adaptation phase and enabling training of the switched one or more gateway devices. In an embodiment, when the second prediction error is greater than the second pre-defined threshold, the method comprises receiving by the one or more gateway devices, observation data from the one or more IoT devices.

In an embodiment, a prediction value is computed by each of the one or more IoT devices based on the bind information. A residual weighted value is computed by each of the one or more IoT devices based on the prediction value and the bind information. In an embodiment, an updated weighted value is computed by each of the one or more IoT devices based on the bind information, and wherein an updated predicted value is computed by each of the one or more IoT devices based on the updated weighted value. In an embodiment, the second prediction error is computed based on the updated predicted value.

In another aspect, there is provided an Internet of Things (IoT) network system. The system comprises: one or more IoT devices; one or more gateway devices in communication with the one or more IoT devices, wherein each of the one or more IoT devices and the one or more gateway devices comprises: a memory storing instructions; one or more communication interfaces; and one or more hardware processors coupled to the memory via the one or more communication interfaces, wherein the one or more hardware processors are configured by the instructions, and wherein when the hardware processors executes the instructions, the one or more gateway devices are configured to: receive, using a Compressive Sensing based Data Prediction (CS-DP) model, observation data from one or more Internet of Things (IoT) devices at one or more time intervals, wherein the observation data comprises a plurality of data packets; capture, a sequence of raw data samples from the received observation data in a data vector representation; compute at each of the one or more gateway devices, a first prediction error based on a residual weighted vector and a prediction vector, wherein the prediction vector is computed using the sequence of raw data samples captured in the data vector representation, and wherein the residual weighted vector is computed using the prediction vector; switch to an estimating phase and compute at each of the one or more gateway devices, using a Compressive Sensing based Data Estimation (CS-DE) model, bind information for each of the one or more IoT devices, and transmitting thereof, wherein the bind information is computed when the first prediction error is less than a first pre-defined threshold; obtain a second prediction error from each of the one or more IoT devices, wherein the second prediction error is computed based on the bind information received from the one or more gateway devices; and switch the one or more gateway devices to a prediction phase and identify and re-construct at least one of missing data and corrupted data in the plurality of data packets, using a Compressive Sensing based Data Reconstruction (CS-DR) model, wherein the at least one of missing data and corrupted data in the plurality of data packets are reconstructed when the second prediction error is less than a second pre-defined threshold.

In an embodiment, when the first prediction error is greater than the first pre-defined threshold, the one or more gateway devices are switched to an adaptation phase and training is enabled for the switched one or more gateway devices.

In an embodiment, when the second prediction error is greater than the second pre-defined threshold, the one or more gateway devices continue to receive observation data from the one or more IoT devices.

In an embodiment, a prediction value is computed by each of the one or more IoT devices based on the bind information. In an embodiment, a residual weighted value is computed by each of the one or more IoT devices based on the prediction value and the bind information. In an embodiment, an updated weighted value is computed by each of the one or more IoT devices based on the bind information, and wherein an updated predicted value is computed by each of the one or more IoT devices based on the updated weighted value. In an embodiment, the second prediction error is computed based on the updated predicted value.

In yet another aspect, there is provided one or more non-transitory machine readable information storage mediums comprising one or more instructions. The one or more instructions which when executed by one or more hardware processors causes receiving, by one or more gateway devices, using a Compressive Sensing based Data Prediction (CS-DP) model, observation data from one or more Internet of Things (IoT) devices at one or more time intervals, wherein the observation data comprises a plurality of data packets; capturing by the one or more gateway devices, a sequence of raw data samples from the received observation data in a data vector representation; computing at each of the one or more gateway devices, a first prediction error based on a residual weighted vector and a prediction vector, wherein the prediction vector is computed using the sequence of raw data samples captured in the data vector representation, and wherein the residual weighted vector is computed using the prediction vector; switching the one or more gateway devices to an estimating phase and computing at each of the one or more gateway devices, using a Compressive Sensing based Data Estimation (CS-DE) model, bind information for each of the one or more IoT devices, and transmitting thereof, wherein the bind information is computed when the first prediction error is less than a first pre-defined threshold; obtaining a second prediction error from each of the one or more IoT devices, wherein the second prediction error is computed based on the bind information received from the one or more gateway devices; and switching the one or more gateway devices to a prediction phase and identifying and re-constructing at least one of missing data and corrupted data in the plurality of data packets, using a Compressive Sensing based Data Reconstruction (CS-DR) model, wherein the at least one of missing data and corrupted data in the plurality of data packets are reconstructed when the second prediction error is less than a second pre-defined threshold.

In an embodiment, when the first prediction error is greater than the first pre-defined threshold, the instructions cause switching the one or more gateway devices to an adaptation phase and enabling training of the switched one or more gateway devices. In an embodiment, when the second prediction error is greater than the second pre-defined threshold, the instructions cause receiving by the one or more gateway devices, observation data from the one or more IoT devices.

In an embodiment, a prediction value is computed by each of the one or more IoT devices based on the bind information. A residual weighted value is computed by each of the one or more IoT devices based on the prediction value and the bind information. In an embodiment, an updated weighted value is computed by each of the one or more IoT devices based on the bind information, and wherein an updated predicted value is computed by each of the one or more IoT devices based on the updated weighted value. In an embodiment, the second prediction error is computed based on the updated predicted value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
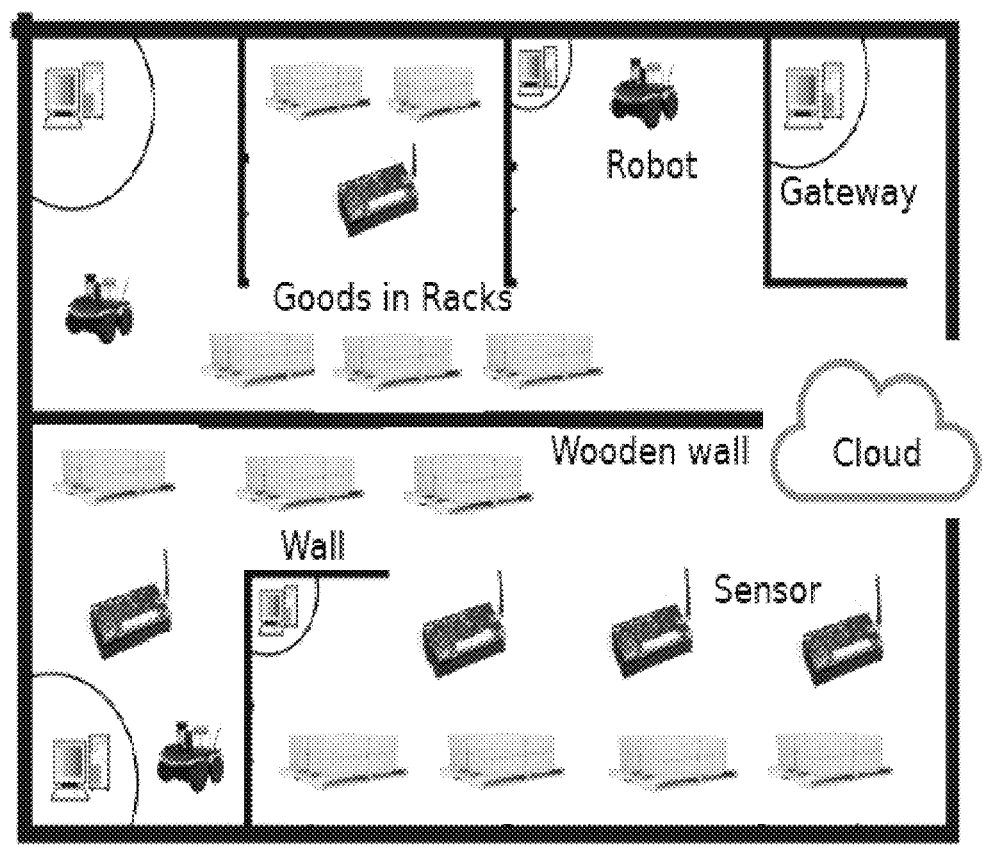
FIG. 1A depicts an exemplary environment of a warehouse in accordance with an embodiment of the present disclosure.

Today, Internet of Things (IoT) devices using wireless networks plays crucial role for information processing in both indoor and outdoor environments such as factories, warehouses, stadiums, war zones, agricultural lands, etc. The IoT devices such as mobile robots, sensors nodes, actuators, drones, etc., are deployed in such kind of environments and transmit sensor data (or sensory information) for further processing. These devices capture similar data (e.g., the sensor data) and transmit it to gateway devices (also referred hereinafter as 'gateway). Gateway is considered as a store and forward device which retrieves information from the IoT devices, performs data acquisition and finally transmits it to a central entity called cloud under cloud robotics framework. Though similar problems for example data loss during transmission, exist in the above environment, the proposed (or present) disclosure considers an environment for example, a warehouse or large departmental store where cosmetic items, pharmaceutical products, soft drinks, dairy products, etc., are stored. Various sensors such as light, temperature, activity, smoke sensor, etc., are deployed for various purpose in such environments. Deploying these sensors to collect continuous data and transmitting that to the gateways are difficult tasks due to obstacles in the deployment (refer FIG. 1A), mobility pattern or deployed machines/robots, and interference of these devices on each other. In particular, FIG. 1A depicts an exemplary environment of a warehouse in accordance with an embodiment of the present disclosure.

IoT devices collect similar type of observation data and transmit it to the gateway devices continuously. Similarity of the data and continuous transmission lead to increase in data redundancy in the network. Data redundancy further makes continuous channel utilization and bandwidth usage thereby increase in communication and computation overhead in the network. To overcome this problem, data prediction and estimation techniques are needed at the gateway devices. To reduce the communication overhead, a predicted mechanism needs to be implemented which limits the flow of data at gateway devices by learning the data pattern. The present disclosure implements a Compressive Sensing based Data Prediction (CS-DP) model that predicts the data based on sparse signaling using adaptive filtering techniques at the gateway devices. Gateways receive the data from the sensor nodes. As time progresses, the data size gets increased and hence gateways need more space to store the data. This leads to increase in computation overhead and the utilization of large space at the gateways. To overcome this problem, the present disclosure implements a Compressive Sensing based Data Estimation (CS-DE) model which selects an optimal bound to represent a subset of data instead of considering the overall data collected at the gateways. CS-DE model helps in (i) considering a subset of data which represents the overall data collected at the gateways and (ii) then by transmitting the same to the cloud. It is to be noted here that during data transmission from the IoT devices to the gateways a certain amount of data gets lost due to various reasons. Data re-transmission is not recommended due to the nature of the IoT system. Moreover, re-transmission requires extra bandwidth thereby increasing in communication overhead in the network. In addition to this, during data prediction and estimation there is a possibility of data loss due to in-accurate prediction at the gateways. Hence it is required to re-construct the data at the gateways. To handle this, the present disclosure implements a Compressive Sensing based Data Reconstruction (CS-DR) model at the gateways. The data prediction, estimation and reconstruction models are implemented jointly to improve the efficiency of the system and the devices compared to the existing literature/techniques.

There exist many applications of warehouse automation in the context of computation and communication. One such application is a decentralized network that was introduced to maximize sensing as well as communication coverage and load sharing through access points in warehouse automation. Other existing literatures present a warehouse design problem which offers efficient and cost effective services in terms of logistics, goods handling and transportation activities, and discuss on the industrial control networks which provide reliability and visibility to enable distributed control over factory infrastructure. These explores the use of Internet in terms of Quality of Services (QoS) by providing high speed bandwidth and minimizing delay in the network. Existing warehouse systems emphasize the warehouse architecture and design based on its characterizations like strategic level, tactical level, and operational level and batching. However these do not address the issues on the feasibility of data reduction strategies aiming data prediction, estimation and reconstruction in the context of communication and computation for different applications, for example, warehouse automation applications and environments.

The aim of data reduction strategies is to reduce the amount of data sent by each sensor node by predicting the data both at sensor nodes and the sink node. Further another literature proposed a synchronization of working mode between the sensor node and the sink to perform better data prediction/estimation by applying adaptive filter techniques. However these models are complex in nature in-terms of computation and processing speed. The present disclosure implements a CS-DP model that does data reduction strategies based on sparse signaling techniques. The proposed technique offers much simpler computation than the existing DPS models. The proposed CS-DP model adapts and learns the training data fast, and hence is much more efficient as compared to the existing prediction mechanisms.

To handle the huge amount of data at the gateways for storing and estimation, existing and traditional systems have proposed approximation methodologies to reduce high dimensional data to low dimensional data using subspace tracking in the context of video applications. For instance, traditional systems have proposed an on-line subspace tracking methodology using On-line Data Tracking and Estimation (ODTE) algorithm that captures spatio-temporal sensor data. It approximates high dimensional data into low dimensional subspace and computes optimal data storage. However these approaches do not talk about the optimal lower bound to estimate the data. Hence the present implements the CS-DE models (considering the ODTE as the base) which can compute a lower-bound for data storage and highly robust in terms of computation as well as processing speed. Further, the present disclosure implements a CS-DR model which can recover the original data from the missing data as received at the gateways.

Referring now to the drawings, and more particularly to FIGS. 1A through 6, where similar reference characters denote corresponding features consistently throughout the figures, there are shown preferred embodiments and these embodiments are described in the context of the following exemplary system and/or method.

Figure 1B:
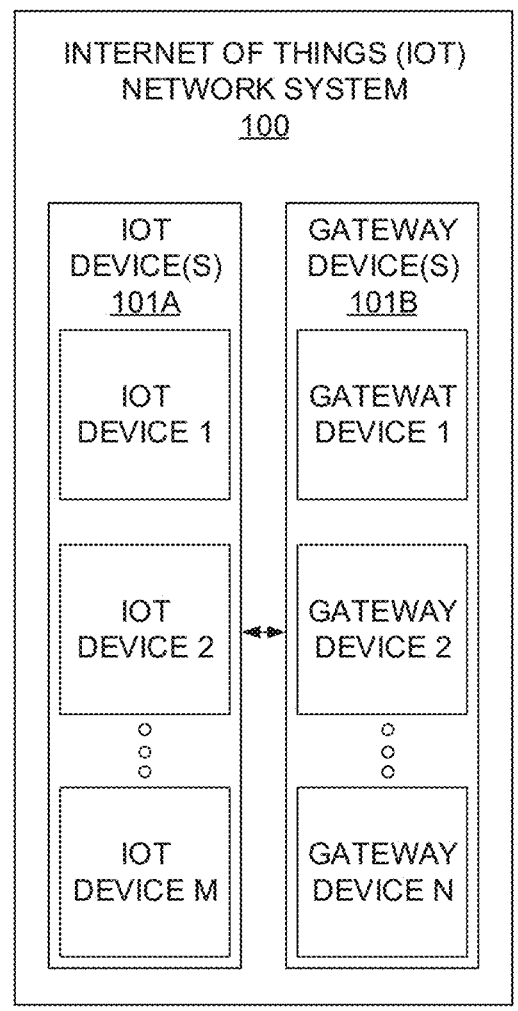
FIG. 1B illustrates an exemplary block diagram of an Internet of Things (IoT) network system that implements compressive sensing for Internet of Things (IoT) networks for data prediction, data estimation and data re-construction respectively, according to an embodiment of the present disclosure.
Figure 1D:
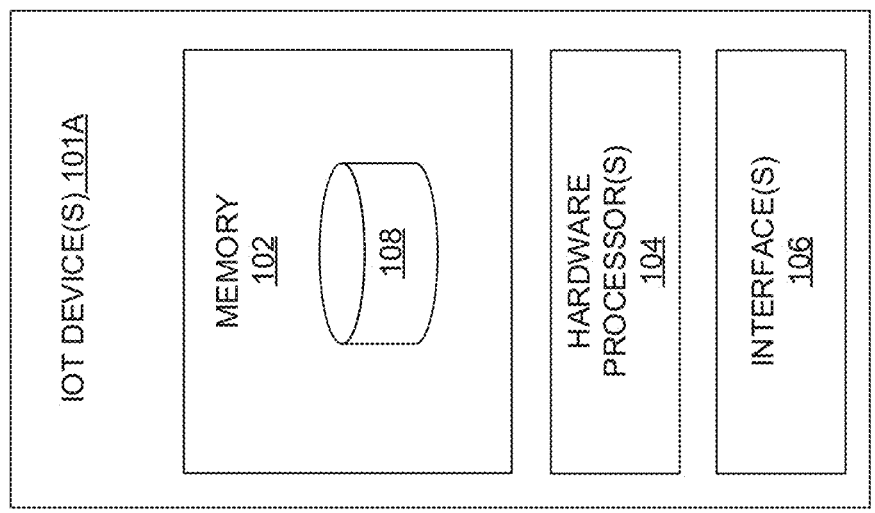
FIGS. 1C-1D illustrate an exemplary block diagram of one or more IoT devices and one or more gateway devices respectively in accordance with an embodiment of the present disclosure.
Figure 1C:
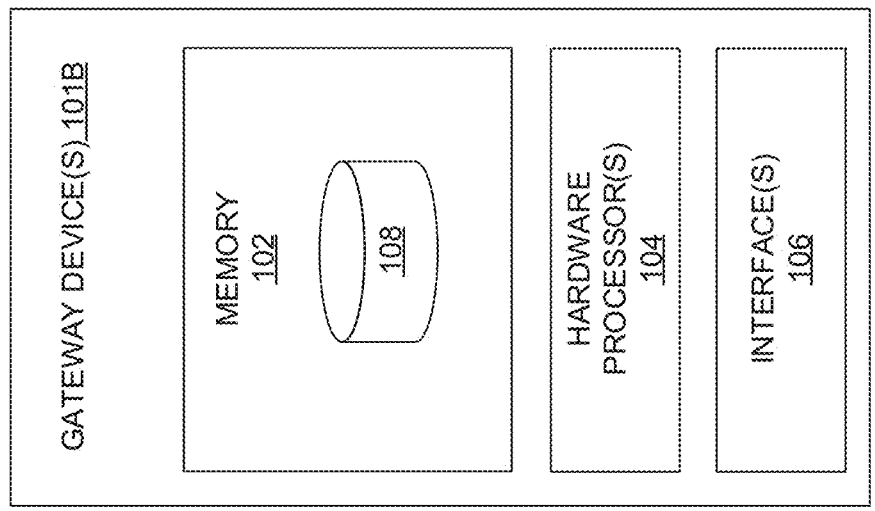

FIG. 1A depicts an exemplary environment of a warehouse in accordance with an embodiment of the present disclosure. As can be seen in FIG. 1A, the environment comprises of for example, but are not limited, robot(s), gateway device(s), goods in racks, sensor(s), objects, and the like. FIG. 1B illustrates an exemplary block diagram of an Things (IoT) network system 100 that implements compressive sensing for Internet of Things (IoT) networks for data prediction, data estimation and data re-construction respectively, according to an embodiment of the present disclosure. The IoT system 100 comprises one or more IoT devices 101A (IoT devices 1 to M) and one or more gateway devices 101B (gateway devices 1 to N) that are in communication with the one or more IoT devices 101A. FIGS. 1C-1D illustrate an exemplary block diagram of the one or more IoT devices 101A (IoT devices 1 to M) and the one or more gateway devices 101B (gateway devices 1 to N) respectively in accordance with an embodiment of the present disclosure. In an embodiment, the each of the one or more IoT devices 101A and the one or more gateway devices 101B includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the memory 102 from each of the one or more IoT devices 101A and the one or more gateway devices are identical. In another embodiment, the memory 102 from each of the one or more IoT devices 101A and the one or more gateway devices are different from each other (e.g., different model(s), manufacturing type, and the like).

In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like. In an embodiment, the hardware processors 104 from each of the one or more IoT devices 101A and the one or more gateway devices are identical. In another embodiment, the hardware processors 104 from each of the one or more IoT devices 101A and the one or more gateway devices may be different from each other (e.g., different model(s), manufacturing type, and the like).

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. In an embodiment, the I/O interface device(s) 106 from each of the one or more IoT devices 101A and the one or more gateway devices are identical. In another embodiment, the I/O interface device(s) 106 from each of the one or more IoT devices 101A and the one or more gateway devices are different from each other (e.g., different model(s), manufacturing type, and the like). For the sake of brevity of description and clarity of explanation of the embodiments, same numerals may be referred to describe the functional flow/components in the system 100, 101A and the 101B.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information pertaining to one or more input data (e.g., input signals or observation data) that are received from one or more IoT devices (e.g., sensors, actuators and the like) for analysis, for data prediction, data estimation and data re-construction at one or more gateway devices. In an embodiment, the memory 102 may store training data that is learnt by the system 100, which gets utilized by the one or more hardware processors 104 (or by the system 100) to enable learning of the data patterns, evaluate the data pattern (or observation data), and train the system 100 using the training data to perform the methodology described herein.

Figure 2:
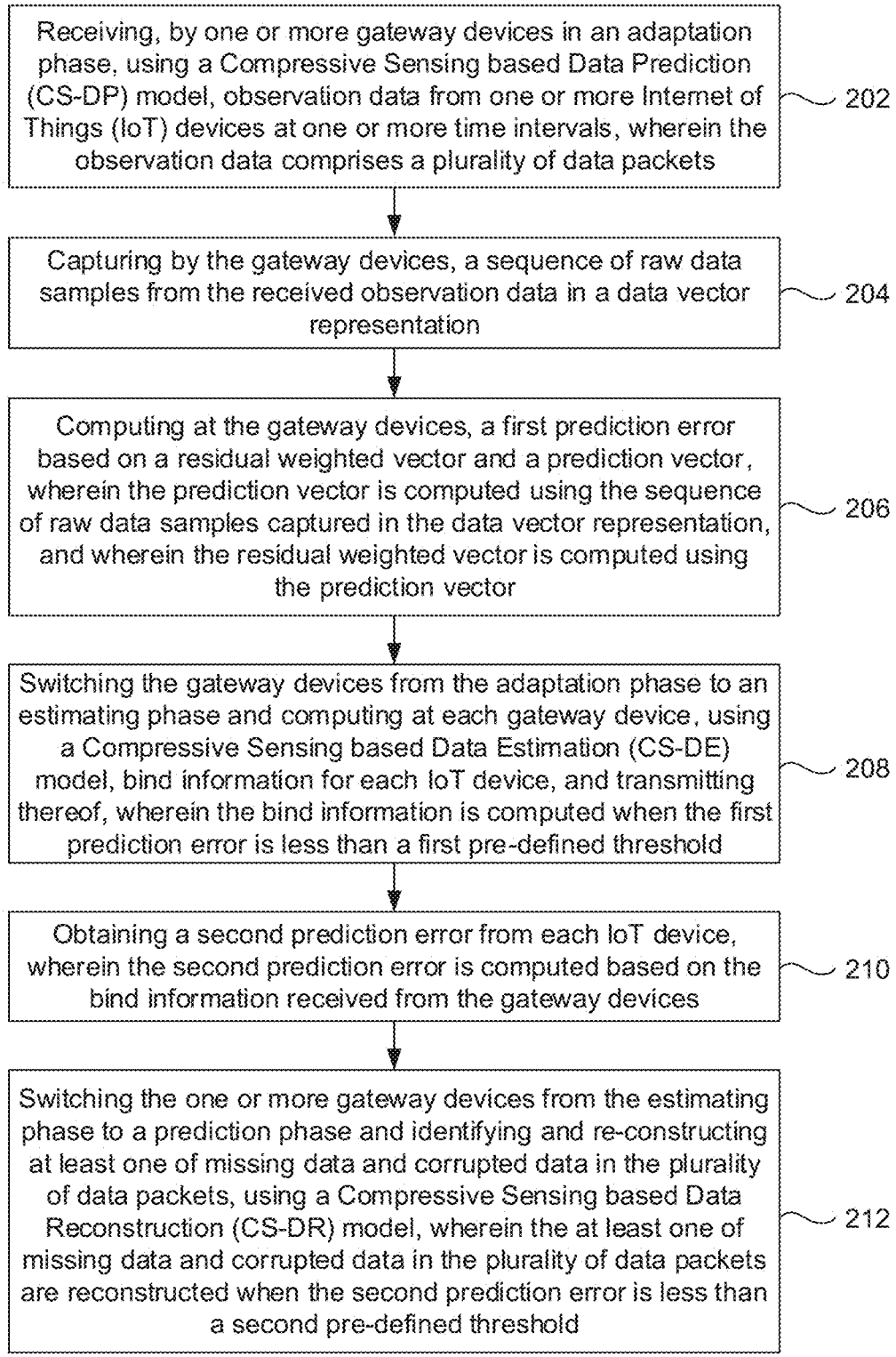
FIG. 2 illustrates an exemplary method for data prediction, data estimation and data re-construction respectively using compressive sensing for Internet of Things (IoT) networks for using the system of FIG. 1B in accordance with an embodiment of the present disclosure.

FIG. 2, with reference to FIGS. 1A-1D illustrates an exemplary method for data prediction, data estimation and data re-construction respectively using compressive sensing for Internet of Things (IoT) networks for using the system 100 of FIG. 1B in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1B and FIG. 1C, and the flow diagram of FIG. 2. In an embodiment of the present disclosure, at step 202, one or more gateway devices (also referred hereinafter gateway device(s)) receive observation data (also referred hereinafter input device, or IoT data) from one or more Internet of Things (IoT) devices (also referred hereinafter IoT device(s)) at one or more time intervals (also referred hereinafter time periods, and the like), wherein the observation data comprises a plurality of data packets (also referred hereinafter data packets or data packet). In an embodiment, the system 100 implements using a Compressive Sensing based Data Prediction (CS-DP) model in order to enable receiving observation data (and the data packets) by the gateway devices. In an embodiment, the observation data (and the data packets) are received by the gateway devices when the gateway devices are in an adaptation phase discussed later in below sections.

In an embodiment of the present disclosure, at step 204, the one or more gateway devices capture a sequence of raw data samples from the received observation data in a data vector representation. An example or a case in scenario of a warehouse automation is considered, wherein IoT devices (e.g., multiple sensors, robots, any similar devices, and the like) and a set of gateways are deployed. The IoT devices are deployed to accurately collect observation data for example, parameters such as temperature, humidity, light, smoke, etc., and report to the gateway. For an example, in a pharmaceutical warehouse, it is necessary to maintain temperature to preserve products such as medicines, injections, dairy products and cosmetics etc. Temperature sensors used here need to measure the temperature accurately and report to the gateways regularly. In the present disclosure, it is assumed that each gateway broadcasts its own beacon signal. The IoT devices which receive the beacon signal of that gateway can communicate with it. Once the communication between the IoT devices and the gateway is established, IoT devices start transmitting the sensed raw data/observation data to it. Thus, the each of the one or more gateway devices capture sequence of raw data samples, n in a vector, $x_1, x_2, \ldots, x_n$ such that $x_{[t]} \in \Re^m$ where t denotes the time stamp at which the data samples are stored in a vector $x_{[t]}$ from m IoT devices. The IoT devices continuously transmit similar data to the gateways. This leads to increase in data redundancy, continuous channel utilization, and high bandwidth usages in the network and require more space for storing as discussed above. To overcome these problems, the present disclosure implement data prediction and estimation techniques at the gateways. To compute these, the present disclosure considers (or implements) a dimensional reduction techniques which reduces the dimension of large data set received at the gateway. In the present disclosure, each of the gateway device(s) computes a d-dimensional subspace from a given subspace say S(t) in $\Re^m$ and captures the column data vector $x_{[t]} \in S(t)$ for each time interval t. The full data matrix (i.e., m×d×d×n) received at the gateway device is reduced to low dimensional matrix using Grassmannian, Gr(m,d)∈S(t) where the matrix m×d is represented by $U_t$. The dimensions d×d is considered as an inner matrix of the full matrix. The column vectors of $U_t$ are orthogonal to each other and spans the subspace such that d≤n. The data vector $v_t$ received at the gateway devices remains in the subspace spanned by U such that:

$$x_t = U_t \alpha + \beta_t + \gamma_t + \zeta_t \quad (1)$$

where the vector coefficient is represented by α with d×1 dimension; $\beta_t$ is the environmental noise in the warehouse dimension area due to the movement of the goods, robots, obstacles (and/or objects), etc. The system noise is represented by $\gamma_t$ and $\zeta_t$ at the IoT devices and gateways respectively. In a warehouse, gateways capture data vector $x_t$ in a regular interval of time. The system 100 further computes the expectation of column vector $x_t$ to get an approximate matrix given by way of example expression below:

$$\mathbb{E}[x_t x_t^T] \approx U \mathbb{E}[\alpha_t \alpha_t^T] U^T \approx \text{corr}\{x_i, x_j\}(t) \quad (2)$$

where $\mathbb{E}[x_t x_t^T]$ is a full rank matrix of m×m dimension which captures the spatially correlated sensed data received at the gateway devices. This covariance matrix extracts data considering the subspace span under $UU^T$ to fix an inner low rank matrix $\alpha_t \alpha_t^T$ of dimension d×d. It can be represented as correlation matrix;

$$\mathbb{E}[x_t x_t^T] = \text{corr}\{x_i, x_j\}(t) = \frac{\text{cov}\{x_i, x_j\}(t)}{\sqrt{\text{var}(x_i)} \sqrt{\text{var}(x_j)}};$$

i,j∈m; ∀t where the nodes i and j capture spatially correlated data in $\mathbb{E}[x_t x_t^T]$ at a discrete time t. The covariance matrix can also be represented under spatio-temporal correlation matrix at time t as:

$$\mathbb{E}[x_t x_t^T] \approx \text{cov}\{x_i, x_j\}(t) = \sigma_{x_i} \sigma_{x_j} \text{corr}\{x_i, x_j\}(t) \quad (3)$$

Correlation model L(.) is adopted in above equation (3) as:

$$\sigma_{x_i} \sigma_{x_j} \text{corr}\{x_i, x_j\}(t) \approx \sigma_{x_{i,j}} L(l_{i,j})(t) \quad (4)$$

In the correlation model, $L(l_{i,j})(t)$ is expressed as $l_{i,j} = \|x_i - x_j\|$ which is the Euclidean distance between the IoT devices i and j at discrete time interval t. The correlation model, $L(l_{i,j})(t)$ is defined as the function which decreases monotonically where $l_{i,j} = \|x_i - x_j\|$ (t) with respect to time with limiting to 1 at l=0, and 0 at l=∞. $L(l_{i,j})(t)$ is expressed in terms of power exponential model, and is given by way of example equation below:

$$L(l_{i,j})(t) \approx e^{(-l_{i,j}/\theta)}(t) \quad (5)$$

where $l_{i,j}$ is the computed distance among IoT devices such that $l_{i,j} = \sqrt{(a_i - a_j)^2 + (b_i - b_j)^2}$ by finding its co-ordinate positions in two-dimensional axis, {a, b}. θ is the range parameter which indicates degree of data correlation among two IoT devices. Using the received power signal $P_{i,j}$, the IoT device i transmits its power to another IoT device i under the log-normal assumption given by way of example equation below:

$$\overline{P}_{i,j} = \overline{P}_0 - 10 n_p \log_{10} \frac{l_{i,j}^c}{d_0} \quad (6)$$

where $\overline{P}_0$ is the received power (in dBm) at a reference distance $d_0$ from the gateway, $n_p$ is the path loss exponent and $l_{i,j}^c$ is the path length between IoT devices i and j for communication range such that $$l_{i,j}^c = d_0 10^{\frac{(P_0 - P_{i,j})}{10 n_p}}.$$

At each gateway, an estimated weighted vector y is computed from S(t) spanned by $U_t$ with reference to $x_t$ as given by way of example equation below:

$$y = \arg\min_\alpha \|U_t \alpha - x_t\|^2 \quad (7)$$

Referring back to FIG. 2, in an embodiment of the present disclosure, at step 206, a first prediction error is computed at each of the one or more gateway devices, based on a residual weighted vector and a prediction vector, wherein the prediction vector is computed using the sequence of raw data samples captured in the data vector representation ($x_t$), and wherein the residual weighted vector is computed using the prediction vector.

Considering the orthogonal matrix $U_t$ and the weighted vector y, the prediction vector, $h = U_t y$ is calculated at the gateways. The residual weighted vector is then computed at the gateways which is the difference between data vector representation ($x_t$) and the predicted vector at h and is given by way of example equation below:

$$w = (x_t - h) \quad (8)$$

Using GROUSE from "Online Identification and Tracking of Subspaces from highly Incomplete Information," published in 48 Annual Allerton Conference on Communication, Control, and Computing, 2010, authored by L. Balzano, R. Nowak, and B. Recht, the subspace is updated by considering step size $\eta_t$ where $\lim_{k \to \infty} \eta_t = 0$, $\Sigma_{k=1}^\infty \eta_t = \infty$ and $$\eta_t \alpha \frac{1}{t}, \forall\, t.$$

The orthogonal matrix updates its subspace by way of following example equation below:

$$U_{t+1} = U_t + \left((\cos(\xi\eta_t) - 1)\frac{h}{\|h\|} + \sin(\xi\eta_t)\frac{w}{\|w\|}\right)\frac{y^T}{\|y\|} \quad (9)$$

where $\xi = \|w\|\|h\|$. The subspace tracking (9) mechanism is used to track the data as fast as possible by updating the previous subspace state $U_t$ to the present subspace state $U_{t+1}$. Using the present subspace state, a covariance matrix, $R_{UU} = \mathbb{E}[U^{t+1}U_{t+1}^T] \approx \sigma_{x_{i,j}}^2 L(l_{i,j})$ is computed which captures the sensed data, $\sigma_{x_{i,j}}^2$ from the IoT devices depending upon the Euclidean distance between them. Similarly, y the reference vector of equation (7) is computed to capture observation data (or sensor data) from the IoT devices and is represented as a reference vector $R_{Uy} = \mathbb{E}[U_{t+1}y]$. Therefore, $R_{UU}$ and $R_{Uy}$ are expressed as:

$$R_{UU} = \sigma_{x_{i,j}}^2 e^{-(l_{i,j}/\theta)} \text{ and } R_{Uy} = \sigma_{x_{iy}}^2 e^{-(l_{i,j}/\theta)} \quad (10)$$

The present disclosure considers a Steepest Descent algorithm/technique, to compute a new update residual vector at the gateway as given by way of example equation below:

$$w_i^* = w_i + \mu(i)[\in(i)I - R_{UU}]^{-1}[R_{Uy} - R_{UU}w_{i-1}] \quad (11)$$

where $\mu(i)$ is some positive scalar value which is set constant $\mu(i) = \mu$. From the covariance matrix, $R_{UU} = U_{t+1}\Lambda U_{t+1}^T$, eigen values are computed as $\lambda_i = \{\lambda_{max}, \ldots, \lambda_{min}\}$ from the diagonal matrix of $\Lambda$. To smooth the convergence of the Steepest Descent algorithm, appropriate positive step size parameter $\mu$ (refer A. H. Sayed, Adaptive Filters. John Wiley Sons, NJ, 2008) is also selected where $$0 < \mu \leq \frac{(\lambda_{max} - \lambda_{min})}{(\lambda_{max} + \lambda_{min})}.$$

To perform the data prediction, the present disclosure implements a Compressive Sensing based Data Prediction (CS-DP) model. The CS-DP model uses adaptive filtering techniques to control the flow of data (refer J. Karjee and M. Kleinsteuber, "Data Estimation with Predictive Switching Mechanism in Wireless Sensor Networks," in Inderscience, Accepted 2016). Under this, each IoT device does not always transmit the sensed data to the gateway, instead the gateway predicts the data for that IoT device. Prediction of data at the gateway consists of the following phases:

Adaptation Phase: Gateways learn the pattern of data received from the IoT devices as well as compute a prediction error budget based on a pre-defined threshold value. If the prediction error budget (also referred as first prediction error) is greater than the threshold value, data received at the gateway gets adopted and trained well.

Estimation Phase: If the prediction error budget is less than the threshold value, gateway switches to estimation phase and computes a bind information (described later) for each IoT device using its updated weighted vector. Later, the gateway transmits the respective bind information to each IoT device. Each IoT device utilizes the bind information and computes its own predicted error budget (also referred as second prediction error). A predefined threshold value is also computed for each IoT device. If the predicted error budget (second prediction error) is greater than the threshold value, IoT devices continues to transmit data to the gateway.

Prediction Phase: Those IoT devices whose prediction error budget is less than the threshold value does not transmit data anymore and the gateway device starts predicting the data for the corresponding IoT device. Thus the transmission overhead can be reduced by controlling the flow of data from the IoT devices to the gateway using prediction mechanism.

Referring back to FIG. 2, in an embodiment of the present disclosure, at step 208, the one or more gateway devices are switched from the adaptation phase to an estimating phase and bind information for each of the one or more IoT devices is computed by the one or more gateway devices, using a Compressive Sensing based Data Estimation (CS-DE) model, and are transmitted back to the IoT devices. In an embodiment of the present disclosure, the bind information is computed when the first prediction error $E_{PG}$ is less than a first pre-defined threshold $T_{PG}$.

Since each IoT device transmits observed data to the gateway device, it gathers the column vector $x_t$ using the subspace spanned by $U_t$ as described in equation (1). Moreover, the predicted vector h is used by the present disclosure to compute the residual weighted vector w as given in equation (8). However for convenience, the present disclosure represents the residual weighted vector w as the prediction error budget denoted by $E_{PG}$ at the gateway given by way of following example equation:

$$E_{PG} = |x_t - h| \quad (12)$$

A threshold value $T_{PG}$ (also referred hereinafter as "a first predefined threshold") is set such that $0 < T_{PG} \leq 1$ at the gateway to satisfy the following two conditions:

If $E_{PG} > T_{PG}$, the gateway device adopts and trains the data samples at each initial time and is switched to adaptation phase. In other words, when the first prediction error $E_{PG}$ is greater than the first pre-defined threshold $T_{PG}$, the one or more gateway devices are switched to an adaptation phase and training of the switched one or more gateway devices is enabled.

If $E_{PG} \leq T_{PG}$, the gateway device is switched to Estimation phase and computes a new update residual weighted vector, $w_i^*$ as given in above equation (11).

In the experiments conducted/performed by the embodiments of the present disclosure, the first per-defined threshold $T_{PG}$ was set to 0.5 and the experimental values for the first prediction error vector are given by: $E_{PG}$=[0.2167, 0.0861, 0.0465, 0.0271, 0.1493, 0.1302, 0.1517, 0.4029, 0.0819, 0.0792, 0.2514] computed for available IoT devices (for example, 11 IoT devices in the current scenario) at the gateway. As can be seen from the values of the first predictor error vector, in this case the prediction error vector $E_{PG}$ is lesser than pre-defined threshold $T_{PG}$, where the gateway is switched to estimation phase for all 11 IoT devices (as considered) and data estimation is done for this specific time duration. In an example embodiment, a transpose of the first prediction error vector may also be considered.

Moreover at the gateway devices, the column vector $x_t$ is updated by considering $U_t$ and $w_i^*$ to form an inner matrix approximation given by way of following example equation:

$$x_t^* = U_t \underline{\alpha\alpha^T} U_t^T w^* \quad (13)$$

The gateway computes a bind information (refer J. Karjee and M. Kleinsteuber, "Data Estimation with Predictive Switching Mechanism in Wireless Sensor Networks," in Inderscience, Accepted 2016), $\{x_{t_i}^*, w_{t_i}^*\}$ for each IoT device i at time stamp t given by:

$$x_t^* = [x_{t_1}^* x_{t_2}^* \cdot x_{t_m}^*]^T \text{ and } w_t^* = [w_{t_1}^* w_{t_2}^* \cdot w_{t_m}^*]^T \quad (14)$$

where m is the number of IoT devices deployed. In the Estimation phase, the gateway transmits each bind information to its respective IoT device. Each IoT device utilizes the received bind information for further computation and computes its predictive value as $h_i^* = x_i w_i^*$, where $x_i$ is the data sample and $w_i^*$ is the updated weighted vector for each IoT device i. In other words, a prediction value is computed by each of the one or more IoT devices based on the bind information. Each IoT device then computes its residual weighted value ($f_i$) considering the difference between one of the bind information and the predicted value as given by way of following example equation:

$$f_i = (x_i^* - h_i^*) \quad (15)$$

In other words, the residual weighted value is computed by each of the one or more IoT devices based on the prediction value and the bind information.

Considering the Least Mean Square (LMS) Filter, an updated weighted vector (or updated weighted value) is computed at each IoT device given by way of following example equation:

$$w_i^{**} = w_i^* + \mu x_i (x_i^* - x_i w_i^*) \quad (16)$$

The predicted value is updated at each IoT device given by way of following example equation:

$$h_i^{} = x_i w_i^{} \quad (17)$$

Predicted error budget (also referred as a second prediction error) at IoT device is given by way of following example equation:

$$E_{PS} = |x_i^* - h_i^{**}| \quad (18)$$

As mentioned above, the second prediction error $E_{PS}$ is computed based on the bind information received from the one or more gateway devices. The second prediction error is further obtained at each of the gateway devices. In other words, at step 210, in an embodiment of the present disclosure, the second prediction error $E_{PS}$ is obtained by the one or more gateway devices from each of the one or more IoT devices, wherein the second prediction error is computed based on the bind information received from the one or more gateway devices.

Considering a threshold value $T_{PS}$ (also referred hereinafter as "a second predefined threshold value") for $0 < T_{PS} \leq 1$ to satisfy the following conditions as given by:

If $E_{PS} > T_{PS}$, IoT device still continues to transmit data to the gateway device. In other words, when the second prediction error is greater than the second predefined threshold, the one or more gateway devices continue to receive the observation data from the one or more IoT devices. In an embodiment the IoT devices continually transmit observation data which is receiving by the gateway devices.

If $E_{PS} \leq T_{PS}$, no data is transmitted from the IoT device to the gateway device thereby switching to Prediction phase. If $E_{PS} < T_{PS}$, then the process repeats once again from the initial phase.

In the experiments conducted/performed by the embodiments of the present disclosure, the second pre-defined threshold $T_{PS}$ was set to 0.5 and the experimental values for the second prediction error is $E_{PS} = 0.3065$ for the IoT device. Since $E_{PS}$ is less than $T_{PS}$, the IoT device thus in this case is switched from estimating phase (also referred as estimation phase) to prediction phase (or predicting phase). However it may be possible that other IoT devices may or may not be switched from estimating phase (also referred as estimation phase) to prediction phase (which depends upon on the predicted error budget) in that specific duration. This means the IoT devices still continue to transmit data at the gateway devices(s) which is considered as (adaptation phase). In the adaptation phase, it is possible that the data may get lost/corrupted while transmitting from IoT devices to gateway device(s). Therefore the gateway devices (or specific gateway device in scenario) can re-construct the missing/corrupted data in the adaptation phase (i.e., before estimation phase and after prediction phase) for a particular IoT device while data transmission from IoT devices can continue (or continues) to the (particular) gateway device(s). Once the data prediction and data re-construction is done, the gateway device(s) estimate(s) the entire data received where a subset of data is captured and transmitted to the cloud instead of transmitting the entire data. This improves the performance of the overall system and requires lesser computation and communication power at the gateways. It is to be understood to a person of having ordinary skill in the art and person skilled in the art, based on the thresholds (e.g., the first pre-defined threshold and the second pre-defined threshold) and the values associated with $E_{PG}$ and $E_{PS}$ obtained from experimental data for scenarios at hand at various instances, the embodiments of the present disclosure may be implemented/performed/executed, for example, in a first order that comprises implementing the CS-DP model to receive observation data, then implementing the CS-DE model to estimate data transmission, followed by implementing the CS-DR model that re-constructs any identified missing/corrupt data from the plurality of data packets. Although the present disclosure describes the above first order implementation, likewise, the embodiments of the present disclosure may be implemented/performed/executed in a second order that comprises implementing the CS-DP model to receive observation data, then implementing the CS-DR model that re-constructs any identified missing/corrupt data from the plurality of data packets, followed by implementing the CS-DE model to estimate data transmission. It would be appreciated that execution of the first order and/or the second order are better understood by way of examples provided and described above with values mentioned for each of the thresholds (the first pre-defined threshold and the second pre-defined threshold which is 0.5) and values of $E_{PG} = [0.2167, 0.0861, 0.0465, 0.0271, 0.1493, 0.1302, 0.1517, 0.4029, 0.0819, 0.0792, 0.2514]$ and $E_{PS} = 0.3065$.

As described above, the data flow was limited at the IoT device(s) and thereby predicting the data at the gateways by considering CS-DP model. This model significantly reduces the data transmission overhead in the network. However as time progress, the quantity of data keeps on increasing at the gateways and hence require an adequate space to store. This leads to increase in computational overhead at the gateways. To overcome this, the present disclosure implements the Compressive Sensing based Data Estimation (CS-DE) model that estimates an optimal set of data for processing and further transmitted to the cloud. In other words, a high-dimensional data received at the gateway from the IoT devices is reduced to a low dimensional data and is transmitted to the cloud thereby reducing the transmission and computational overheads. The system computes a cost function at the gateway by considering the column vector $x_t$, updated orthogonal matrix $U_{t+1}$ and the updated residual vector $w^*$ given by way of following example equation:

$$J(w^*) = \arg_{w^*}^{min} \|(x_t - U_{t+1}U_{t+1}^T w^*)\|^2 \quad (19)$$

The system 100 (or each of the gateway device(s)) further implements normalization methodology (or normalization methodologies) over the received cost function and computes a Distortion Factor (D.F) using CS-DE model as given by following example equation:

$$D.F_{CS-DE} = \left(1 - \frac{J(w^*)}{\sigma_x^2}\right) \quad (20)$$

The CS-DE model can be used for storing optimal data instead of the entire data without losing significant information. It can provide faster data processing/tracking at the one or more gateway devices.

As mentioned above, in the warehouse environment, each IoT device captures the raw data (or also referred as observation data) at a regular interval of time. The captured data is (generally) a numerical value which needs to be converted to a data packet before transmitted to one or more gateway devices. Once the data packet(s) is/are received at the gateway, de-packetization of data needs to be performed to convert data packet to original raw data. However, during the transmission of data packet from the IoT device(s) to the gateway device(s), the data packet may get lost due to signal interference in the environment and the obstacles/objects in the warehouse scenario, etc. Re-transmission of the data packet is avoided in this case wherein the system 100 (or the gateway device(s)) implement a Compressive Sensing based Data Re-construction (CS-DR) model which is configured to re-construct any missing data or any corrupted data being received at the gateway device(s). Using the equations (9) and (11), a reconstruction matrix is computed at gateway device using the CS-DR model, and is given by way of following example equation:

$$Y = |X - U_{t+1}(U_t^T w^*)| \quad (21)$$

where $X_{m \times n} = [x_{t1}, x_{t1}, \ldots, x_{tm}]$ for m IoT devices capturing n data samples (or observation data) for each time interval of time t. At each time instant data of all the m IoT devices gets tracked independently. This helps in re-constructing the missing/lost and/or corrupted data at any IoT device(s) at any time instant. In other words, in an embodiment of the present disclosure, at step 212, the one or more gateway devices are switched from the estimating phase to a prediction phase and at least one of missing data and corrupted data in the plurality of data packets are identified and re-constructed using the Compressive Sensing based Data Reconstruction (CS-DR) model. In an embodiment, the at least one of missing data and corrupted data in the plurality of data packets are reconstructed when the second prediction error is less than the second pre-defined threshold as described above. In an embodiment, the CS-DP, CS-DE and CS-DR models are stored in the one or more gateway devices (101B) and are executed at the one or more gateway devices (101B) to perform the methodology described herein.

Below illustrated is an exemplary algorithm implemented by the embodiments of the present disclosure to perform a method for Compressive Sensing Data Prediction, Estimation and Reconstruction at the Gateways:

---

Require: An m × d orthogonal matrix $U_0$, sequences of vector $x_t$, step size $\eta_t$ are considered.
Returns: Predicts, Estimates and Re-construct data at a gateway (or gateway device.
1. for t = 1, 2, . . . T do 2. Weighted vector $y = \arg \min_\alpha \|(U_t \alpha - x_t)\|^2$ 3. Compute Prediction vector $h = U_t y$
4. Compute Residual weight vector $w = (x_t - h)$ 5. Update subspace using GROUSE: $U_{t+1} = U_t + \left((\cos(\xi \eta_t) - 1)\frac{h}{\|h\|} + \sin(\xi \eta_t)\frac{w}{\|w\|}\right)\frac{y^T}{\|y\|}$ for $\xi = \|w\| \|h\|$ 6. Update residual vector: $w_i^* = w_i + \mu(i)[\in (i)I - R_{UU}]^{-1}[R_{Uy} - R_{UU}w_{i-1}]$ where $R_{UU} = \sigma_{x_{ij}}^2 e^{-(t_{i,j}/\theta)}, R_{Uy} = \sigma_{x_{iy}}^2 e^{-(t_{i,j}/\theta)}$ and SVD of $R_{UU} = U_{t+1}\Lambda U_{t+1}^T$.

Figure 3:
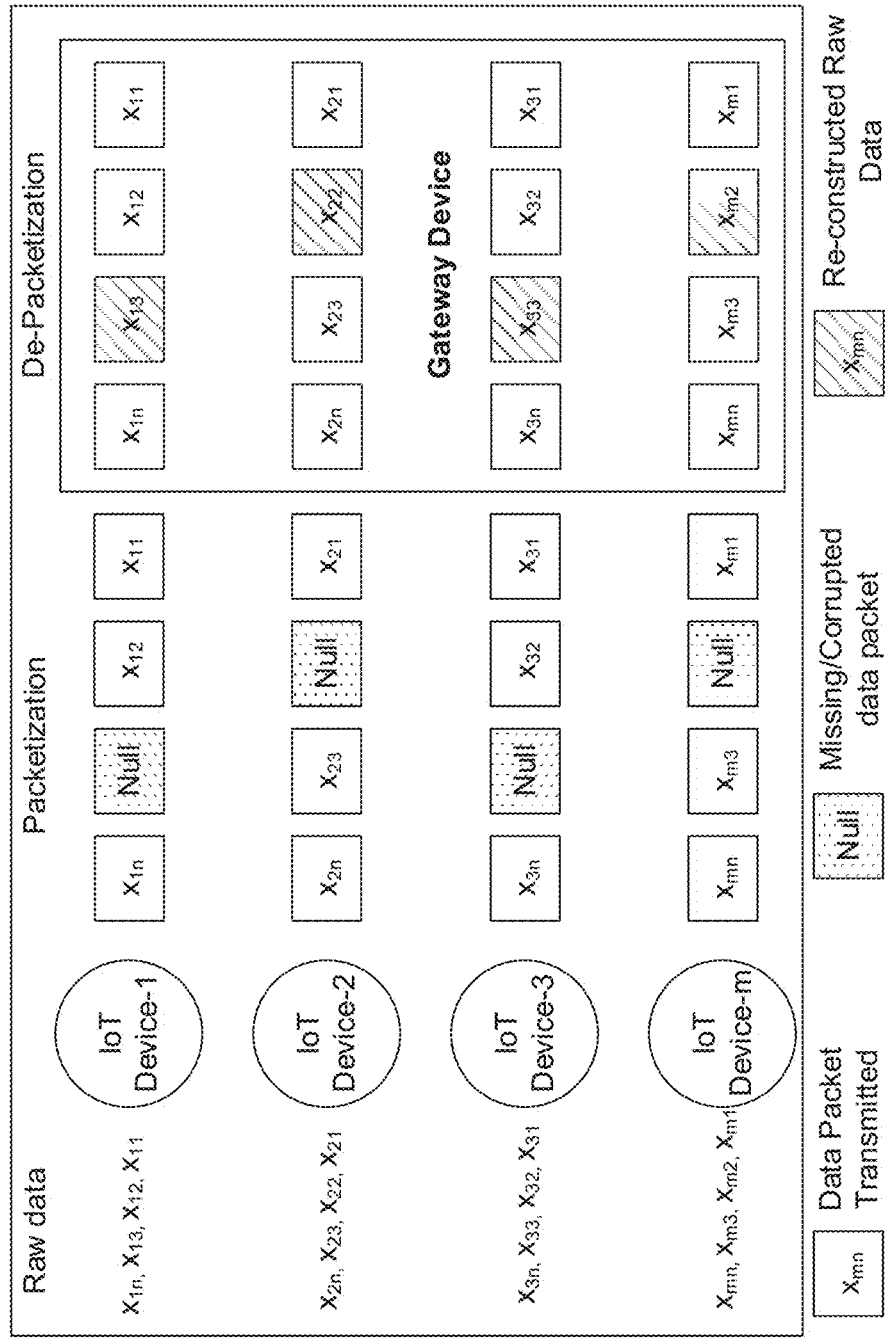
FIG. 3 illustrate an exemplary block diagram illustrating a method data prediction, data estimation and data re-construction respectively using compressive sensing for Internet of Things (IoT) networks for using the system of FIG. 1B in accordance with an embodiment of the present disclosure.

Taking largest and smallest Eigen values from $\lambda_{max}$ and $\lambda_{min}$ from $\Lambda$ to get $0 <$ $\mu \leq \frac{(\lambda_{max} - \lambda_{min})}{(\lambda_{max} + \lambda_{min})}$ 7. Prediction error: $E_{PG} = |x_t - h|$
8. Define threshold ($T_{PG}$) at a gateway for $0 < T_{PG} \leq 1$
9. if $E_{PG} > T_{PG}$
   → Switched to Adaptation phase
10. Else $E_{PG} \leq T_{PG}$ → Update $x_t$ as $x_t^* = U_t \underline{\alpha \alpha^T} U_t^T w^*$ → Computes bind information $\{x_{t_i}^*, w_{t_i}^*\}$ for each IoT device i at time stamp t given by: $x_t^* = [x_{t_1}^* x_{t_2}^* . x_{t_m}^*]^T$ and $w_t^* = [w_{t_1}^* w_{t_2}^* . w_{t_m}^*]^T$ -continued → Transmits $\{x_{t_i}^*, w_{t_i}^*\}$ to each IoT device i
→ Switched to Estimation phase
11. end if
12. Each IoT device i receives $\{x_{t_i}^*, w_{t_i}^*\}$
13. Predicted value: $h_i^* = x_i w_i^*$
14. Residual weighted value: $f_i = (x_i^* - h_i^*)$
15. Updated weighted value: $w_i^{**} = w_i^* + \mu x_i (x_i^* - x_i w_i^*)$
16. Updated predicted value: $h_i^{} = x_i w_i^{}$
17. Prediction error: $E_{PS} = |x_i^* - h^{**}|$
18. Define Threshold ($T_{PS}$) at each IoT device for $0 < T_{PS} \leq 1$
19. if $E_{PS} > T_{PS}$ then
    → IoT device continues to transmit data to a gateway
20. else $E_{PS} \leq T_{PS}$
    → IoT device stops transmitting data to a gateway
21. end if
22. Gateway switches to Prediction phase 23. Cost function: $J(w^*) = \arg\min_{w^*} \|(x_t - U_{t+1} U_{t+1}^T w^*)\|^2$ 24. Estimation at gateway: $D.F_{CS-DE} = \left(1 - \dfrac{J(w^*)}{\sigma_x^2}\right)$ 25. Re-construction at gateway: $Y = |X - U_{t+1}(U_t^T w^*)|$
26. end for FIG. 3, with reference to FIGS. 1A through 2, illustrates an exemplary block diagram illustrating a method data prediction, data estimation and data re-construction respectively using compressive sensing for Internet of Things (IoT) networks for using the system 100 in accordance with an embodiment of the present disclosure. In FIG. 3, an example for computing reconstruction of data at the gateways is considered. In FIG. 3, raw data ($x_{ij}$) is captured by i={1, 2, ..., m} and j={1, 2, ..., n} for n data samples. The transmitted and the lost/corrupted data packets are indicated by green box and red box respectively. The de-packetization is performed at the gateway where reconstruction of raw data is computed for the lost/corrupted data packet.

Simulations and Validations

To validate CS-DP, CS-DE and CS-DR models, an indoor environment was considered where 54 Mica2Dot sensors or IoT devices are deployed as in the Intel Berkeley Research Lab (http://db.csail.mit.edu/labdata/labdata.html). This scenario is equipped with obstacles such as walls, wooden racks, stair-cases, etc., and was similar to a large warehouse or a departmental store where sensors and gateways are deployed as considered in the present disclosure. The deployed sensors collect the temperature data at discrete intervals of time (data set considered here is based on the 28 Feb. 2004 logs) and send to a gateway. In the present disclosure, it is assumed that all the 54 IoT devices are within the communication range of the gateway. The coordinates of the gateway is fixed at [20, 20]. To validate the models, each IoT device is considered to transmit 1000 observed data samples to the gateway over a discrete interval of time. For the system model, the following parameters are considered: $\eta_t$=0.1, $\in$=1 and $\theta$=170. d=7 was inputted to satisfy equation (2) as the rank of underlying subspace spanned by $U_t$. Since, the IoT device transmits data, a certain amount of data gets lost or corrupted as reported at the gateway. In the present disclosure, it was assumed 10% of data loss/corruption at the gateway. The communication parameters such as the path loss exponent ($\eta_p$) is considered as 5 for indoor scenario and the transmit power is considered as 20 dBm. The present disclosure compare the proposed schemes with the state of art (i) J. Karjee and H. Jamadagni, "Data Accuracy Models under Spatio-Temporal Correlation with Adaptive Strategies in Wireless Sensor Networks," in ACEEE Int. J. on Network Security, vol. 4, no. 1, 2013, pp. 24-34 (also referred as "STDP"), (ii) N. Patwari and A. O. Hero, "Using proximity and quantized RSS for sensor networks and applications," in 2nd ACM international conference on Wireless sensor networks and applications, 2003, pp. 20-29 (also referred as "ODTE") and (iii) J. He, L. Balzano, and B. Recht, "Online Robust Subspace Tracking from Partial Information," in arXiv.org, 2011 (also referred as "GRASTA" models.

Figure 4A:
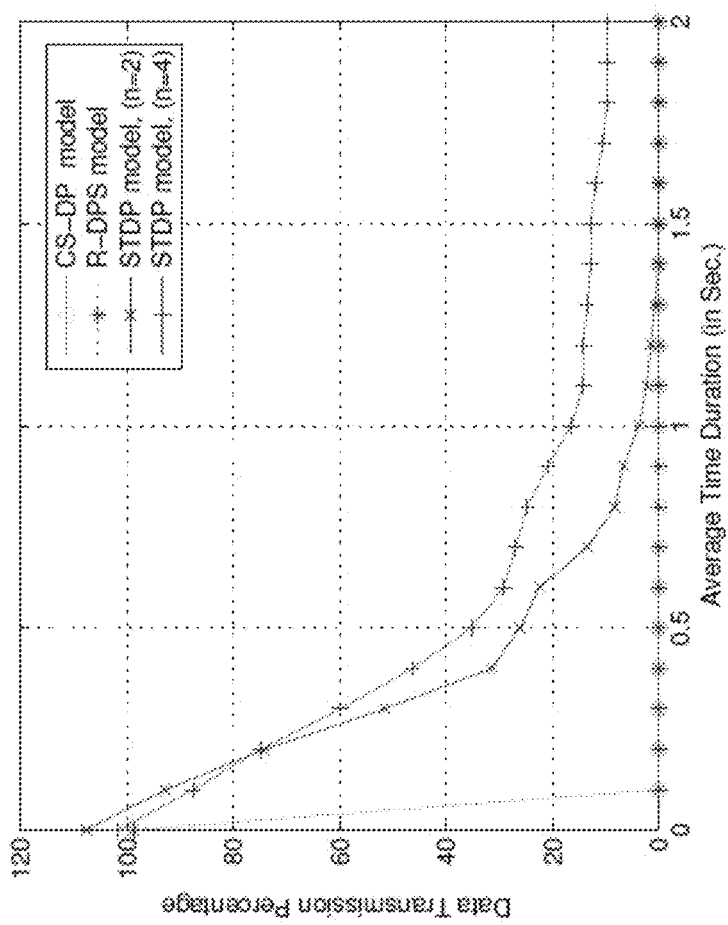
FIGS. 4A-4B illustrate a graphical representation depicting data transmission with reference to time in accordance with an example embodiment of the present disclosure.
Figure 4B:
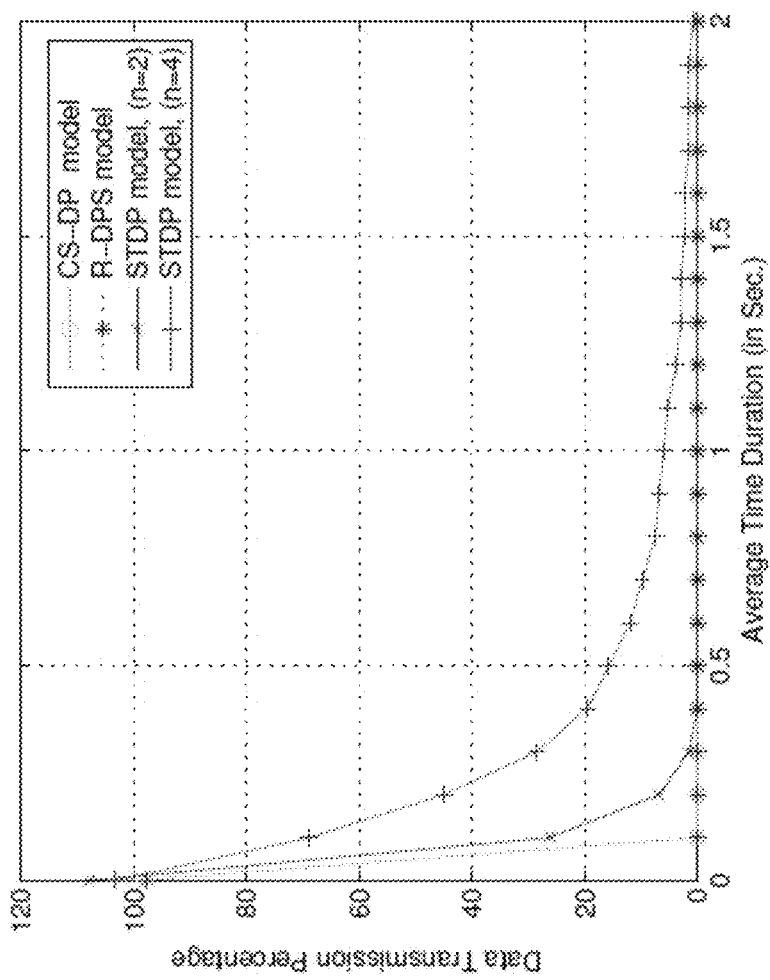

In the first setup, the IoT devices were considered to be continuously transmitting raw data to the gateway. As the time progresses, the gateway starts predicting data for each IoT device using CS-DP model. Out of 54 IoT devices, IoT device number-3 to plot the data transmission percentage with respect to average time duration as shown in FIGS. 4A and 4B. More particularly, FIGS. 4A-4B, with reference to FIGS. 1A through 3, illustrate a graphical representation depicting data transmission with reference to time in accordance with an example embodiment of the present disclosure. In the proposed CS-DP model, the threshold values $T_{PG}$ and $T_{PS}$ were considered within the range 0 and 1. These values can be selected based on the computation power of the gateways. In the proposed simulation setup, $T_{PG}$ and $T_{PS}$ are set to 0.5. As depicted in FIG. 4A, the normal temperature data (e.g., normal data) was captured where the results depict that after certain duration of time, the IoT device number-3 stops transmitting data to the gateway and the gateway starts predicting data for that IoT device. FIG. 4A indicates that both CS-DP and R-DPS have the optimal convergence time with predicted latency of 0.1 second. Therefore CS-DP and R-DPS models can train, track and predict data much faster as compared to the STDP model. In STDP model, to track data samples with block size of n=2 and n=4, the convergence time of 1.34 second and 2.23 second respectively are required. Therefore the average delay in STDP model is much more than the CS-DP and R-DPS models. Note that with smaller block size, tracking and learning of data is faster as in CS-DP and R-DPS models as compared to STDP which uses larger block size. This signifies that both CS-DP and R-DPS model can train, predict and track/process data faster than the STDP model. More the duration of prediction phase than the training phase, lesser the possibility of communication overhead in the network.

The present disclosure also tested the performance of the proposed CS-DP model while considering abnormal temperature data which can result due to fire or similar incidents as shown in FIG. 4B. In this scenario, both CS-DP and R-DPS also have the same optimal convergence time with predicted latency of 0.1 second. It is also observed that the average delay of STDP model is more than CS-DP and R-DPS model. Note that the abnormal data is detected faster than normal data while considering STDP model, whereas it is the 0.1 second for both CS-DP and R-DPS models. For example, while considering abnormal temperature for n=2, the predicted delay is only 0.294 second as compared to the delay of 1.34 second for the normal data. Hence the algorithms can predict abnormal data much faster with less average delay than capturing normal data.

Figure 5:
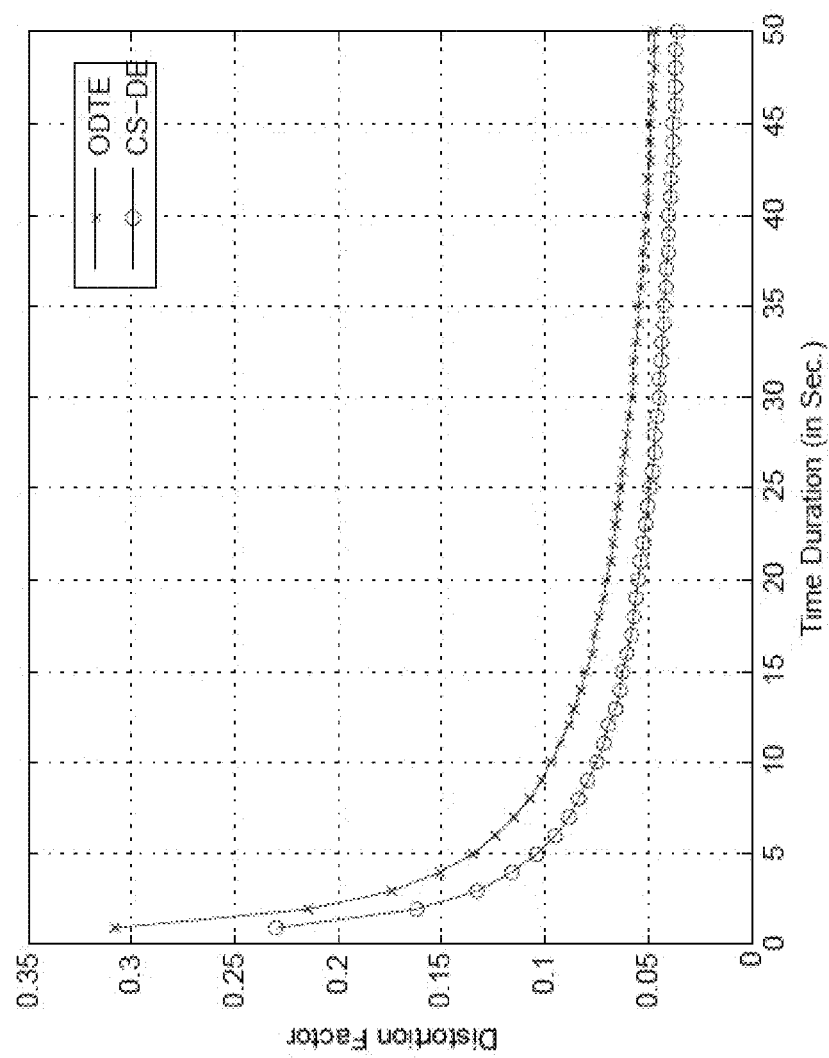
FIG. 5 illustrates a graphical representation depicting Distortion Factor computed with reference to time in accordance with an example embodiment of the present disclosure.

In the second simulation, the distortion factor (D.F.) using CD-DE model to capture the number of data samples per second received at the gateway as shown in FIG. 5. More particularly, FIG. 5, with reference to FIGS. 1A through 4B, illustrates a graphical representation depicting depicts Distortion Factor computed with reference to time in accordance with an example embodiment of the present disclosure. FIG. 5 indicates an optimal bound for the received data samples at the gateway with respect to time. The D.F. deceases exponentially and after certain duration it does not reduce. This is due to the global minimum bound achieved during the data processing at gateway. The achieved global optimum concludes that by receiving more number of samples, it does not create additional advantages over D.F. at the gateway. The received optimal data is sufficient to represent the overall data at the gateway. CS-DE model performs better in terms of storage and processing of data at the gateway than the state of art ODTE model.

Figure 6:
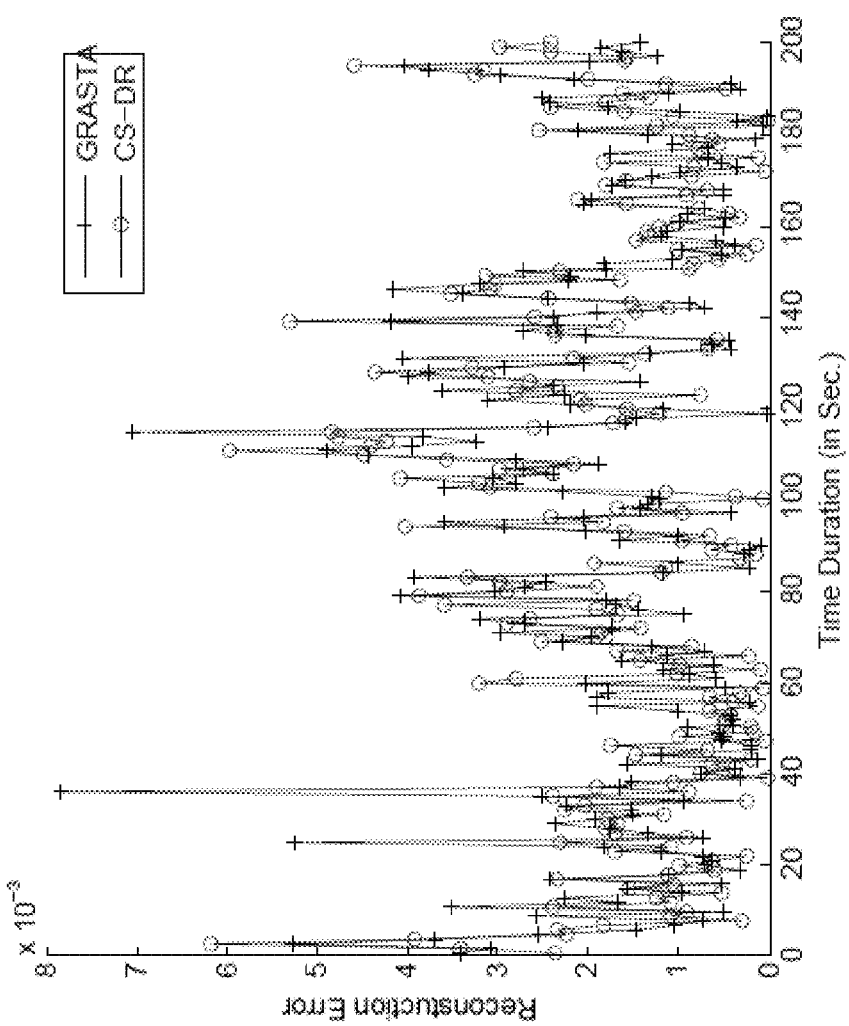
FIG. 6 illustrates a graphical representation depicting a comparison of reconstruction error for proposed model and traditional model in accordance with an example embodiment of the present disclosure.

Finally in the third simulation setup, the reconstruction error was computed using CS-DR. The reconstruction error is defined as the error between the original data received with respect to the data received with some lost/corrupted data at the gateway. FIG. 6, with reference to FIGS. 1A through 5, illustrates a graphical representation depicting a comparison of reconstruction error for proposed model and traditional model in accordance with an example for the present disclosure. In FIG. 6, the reconstruction error is compared for CS-DR and GRASTA with reference to (w.r.t.) to time. The result depicts that reconstruction error for CS-DR model is improved by 2% over GRASTA. Though the improvement is not large, it is significant in-terms of avoiding re-transmission of data from IoT devices to the gateway. Finally, the present disclosure concludes that CS-DR model re-constructs data better than GRASTA.

Embodiments of the present disclosure proposed the CS-DP model which predicts data based on an adaptive control mechanism at the gateways in a large warehouse or departmental store deployment. It significantly reduces the data transmission overhead in the network. Moreover as the time progress, the quantity of data received at the gateway increases which can degrade the performance of data processing. It also requires adequate data storage capacity. To solve this problem, the CS-DE model is proposed and implemented by the system, wherein the CS-DE model estimates and stores optimal data instead of capturing the overall data at the gateways. It gives better data estimation as compared to the existing models and significantly reduces the computation overhead at the gateways. Finally, the system 100 implements the CS-DR model that reconstructs missing/corrupted data received at the gateways. Moreover CS-DR model performs better than GRASTA in-terms of re-constructing data at the gateways. This method can avoid re-transmission of data from the IoT devices to the gateways, thereby reducing the communication overhead. All these models proposed by the present disclosure are used as a single entity (example stored in the memory 102 and jointly executed via the one or more hardware processors 104 instead of separate entities at the gateway. This improves the performance of the overall system and requires lesser computation and communication power at the gateways.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
    receiving, by one or more gateway devices, using a Compressive Sensing based Data Prediction (CS-DP) model, observation data from one or more Internet of Things (IoT) devices at one or more time intervals, wherein the observation data is received when the one or more gateway devices are in an adaptation phase, and wherein the observation data comprises a plurality of data packets (202);
    capturing by the one or more gateway devices, a sequence of raw data samples from the received observation data in a data vector representation (204);
    computing at each of the one or more gateway devices, a first prediction error based on a residual weighted vector and a prediction vector, wherein the prediction vector is computed using the sequence of raw data samples captured in the data vector representation, and wherein the residual weighted vector is computed using the prediction vector (206);
    switching the one or more gateway devices from the adaptation phase to an estimating phase and computing at each of the one or more gateway devices, using a Compressive Sensing based Data Estimation (CS-DE) model, bind information for each of the one or more IoT devices, and transmitting thereof, wherein the bind information is computed when the first prediction error is less than a first pre-defined threshold (208);
    obtaining a second prediction error from each of the one or more IoT devices, wherein the second prediction error is computed based on the bind information received from the one or more gateway devices (210); and
    switching the one or more gateway devices from the estimating phase to a prediction phase and identifying and re-constructing at least one of missing data and corrupted data in the plurality of data packets, using a Compressive Sensing based Data Reconstruction (CS-DR) model, wherein the at least one of missing data and corrupted data in the plurality of data packets are reconstructed when the second prediction error is less than a second pre-defined threshold (212).

2. The processor implemented method of claim 1, wherein when the first prediction error is greater than the first pre-defined threshold, the method comprises switching the one or more gateway devices to an adaptation phase and enabling training of the switched one or more gateway devices.

3. The processor implemented method of claim 1, wherein when the second prediction error is greater than the second pre-defined threshold, the method comprises receiving by the one or more gateway devices, the observation data from the one or more IoT devices.

4. The processor implemented method of claim 1, further comprising computing a prediction value by each of the one or more IoT devices based on the bind information.

5. The processor implemented method of claim 4, further comprising computing a residual weighted value by each of the one or more IoT devices based on the prediction value and the bind information.

6. The processor implemented method of claim 5, further comprising computing an updated weighted value by each of the one or more IoT devices based on the bind information, and an updated predicted value by each of the one or more IoT devices based on the updated weighted value.

7. The processor implemented method of claim 6, wherein the second prediction error is computed based on the updated predicted value.

8. An Internet of Things (IoT) network system (100) comprising:
    one or more IoT devices (101A);
    one or more gateway devices (101B) in communication with the one or more IoT devices (101A), wherein each of the one or more IoT devices (101A) and the one or more gateway devices (101B) comprises:
    a memory (102) storing instructions;
    one or more communication interfaces (106); and
    one or more hardware processors (104) coupled to the memory (102) via the one or more communication interfaces (106), wherein the one or more hardware processors (104) are configured by the instructions, and wherein when the hardware processors (104) executes the instructions, the one or more gateway devices (101B) are configured to:
    receive during an adaptation phase, using a Compressive Sensing based Data Prediction (CS-DP) model, observation data from one or more Internet of Things (IoT) devices at one or more time intervals, wherein the observation data comprises a plurality of data packets;
    capture, a sequence of raw data samples from the received observation data in a data vector representation;
    compute at each of the one or more gateway devices (101B), a first prediction error based on a residual weighted vector and a prediction vector, wherein the prediction vector is computed using the sequence of raw data samples captured in the data vector representation, and wherein the residual weighted vector is computed using the prediction vector;

switch from the adaptation phase to an estimating phase and compute at each of the one or more gateway devices (101B), using a Compressive Sensing based Data Estimation (CS-DE) model, bind information for each of the one or more IoT devices, and transmitting thereof, wherein the bind information is computed when the first prediction error is less than a first pre-defined threshold;

obtain a second prediction error from each of the one or more IoT devices (101A), wherein the second prediction error is computed based on the bind information received from the one or more gateway devices (101B); and switch the one or more gateway devices (101B) from the estimating phase to a prediction phase and identify and re-construct at least one of missing data and corrupted data in the plurality of data packets, using a Compressive Sensing based Data Reconstruction (CS-DR) model, wherein the at least one of missing data and corrupted data in the plurality of data packets are reconstructed when the second prediction error is less than a second pre-defined threshold.

9. The IoT network system of claim 8, wherein when the first prediction error is greater than the first pre-defined threshold, the one or more gateway devices are switched to an adaptation phase and training is enabled for the switched one or more gateway devices.

10. The IoT network system of claim 8, wherein when the second prediction error is greater than the second pre-defined threshold, the method comprises receiving by the one or more gateway devices, observation data from the one or more IoT devices.

11. The IoT network system of claim 8, wherein each of the one or more IoT devices are configured by the instructions to compute a prediction value based on the bind information.

12. The IoT network system of claim 11, wherein each of the one or more IoT devices are further configured by the instructions to compute a residual weighted value based on the prediction value and the bind information.

13. The IoT network system of claim 12, wherein each of the one or more IoT devices are further configured by the instructions to compute: an updated weighted value based on the bind information, and an updated predicted value based on the updated weighted value.

14. The IoT network system of claim 13, wherein the second prediction error is computed based on the updated predicted value.

15. One or more non-transitory machine readable information storage mediums comprising one or more instructions which when executed by one or more hardware processors causes:

receiving, by one or more gateway devices, using a Compressive Sensing based Data Prediction (CS-DP) model, observation data from one or more Internet of Things (IoT) devices at one or more time intervals, wherein the observation data comprises a plurality of data packets;

capturing by the one or more gateway devices, a sequence of raw data samples from the received observation data in a data vector representation;

computing at each of the one or more gateway devices, a first prediction error based on a residual weighted vector and a prediction vector, wherein the prediction vector is computed using the sequence of raw data samples captured in the data vector representation, and wherein the residual weighted vector is computed using the prediction vector;

switching the one or more gateway devices to an estimating phase and computing at each of the one or more gateway devices, using a Compressive Sensing based Data Estimation (CS-DE) model, bind information for each of the one or more IoT devices, and transmitting thereof, wherein the bind information is computed when the first prediction error is less than a first pre-defined threshold;

obtaining a second prediction error from each of the one or more IoT devices, wherein the second prediction error is computed based on the bind information received from the one or more gateway devices; and switching the one or more gateway devices to a prediction phase and identifying and re-constructing at least one of missing data and corrupted data in the plurality of data packets, using a Compressive Sensing based Data Reconstruction (CS-DR) model, wherein the at least one of missing data and corrupted data in the plurality of data packets are reconstructed when the second prediction error is less than a second pre-defined threshold.

16. The one or more non-transitory machine readable information storage mediums of claim 15, wherein when the first prediction error is greater than the first pre-defined threshold, the instructions further cause switching the one or more gateway devices to an adaptation phase and enabling training of the switched one or more gateway devices.

17. The one or more non-transitory machine readable information storage mediums of claim 15, wherein when the second prediction error is greater than the second pre-defined threshold, the instructions further cause receiving by the one or more gateway devices, the observation data from the one or more IoT devices.

18. The one or more non-transitory machine readable information storage mediums of claim 15, wherein the instructions further cause computing a prediction value by each of the one or more IoT devices based on the bind information.

19. The one or more non-transitory machine readable information storage mediums of claim 18, wherein the instructions further cause computing a residual weighted value by each of the one or more IoT devices based on the prediction value and the bind information.

20. The one or more non-transitory machine readable information storage mediums of claim 19, further comprising computing an updated weighted value by each of the one or more IoT devices based on the bind information, and an updated predicted value by each of the one or more IoT devices based on the updated weighted value, and wherein the second prediction error is computed based on the updated predicted value.

* * * * *